United States Patent [19]
Muti

[11] Patent Number: 4,586,741
[45] Date of Patent: May 6, 1986

[54] FLASHLIGHT HOLDER

[76] Inventor: Elliott J. Muti, 3423 E. Pratt St., Baltimore, Md. 21224

[21] Appl. No.: 632,643

[22] Filed: Jul. 20, 1984

[51] Int. Cl.⁴ .......................... B25J 1/02; F21V 21/08
[52] U.S. Cl. .................................... 294/19.1; 362/396
[58] Field of Search ................ 294/1 R, 19 R, 20-24; 15/144 R, 146; 248/359 R, 360; 362/102, 109, 120, 190, 191, 382, 396, 399, 431

[56] References Cited

U.S. PATENT DOCUMENTS

| | | | |
|---|---|---|---|
| 1,176,203 | 3/1916 | Comer | 362/396 X |
| 1,234,833 | 7/1917 | Walter | 362/396 |
| 1,403,707 | 1/1922 | Quarnstrom | 362/396 |
| 1,621,645 | 3/1927 | Thorp | 362/396 |
| 2,443,233 | 6/1948 | Filardo | 15/144 R |
| 2,716,184 | 8/1955 | O'Neil | 248/359 R X |
| 2,732,543 | 1/1956 | Mogren | 362/190 X |
| 3,199,905 | 8/1965 | Johnson | 294/19 R X |
| 4,374,600 | 2/1983 | Van Zelm | 294/22 X |

Primary Examiner—Johnny D. Cherry

[57] ABSTRACT

The invention is an improved holder for a flashlight for extending the flashlight to a remote area, such as down in a manhole below grade or floor level or high above grade or floor level, where the need for light may not be readily accessible to the user of the flashlight. The flashlight holder consists of a plurality of extension rod members, a carrier arm member, a plurality of holder strap members, and a plurality of connectors.

13 Claims, 3 Drawing Figures

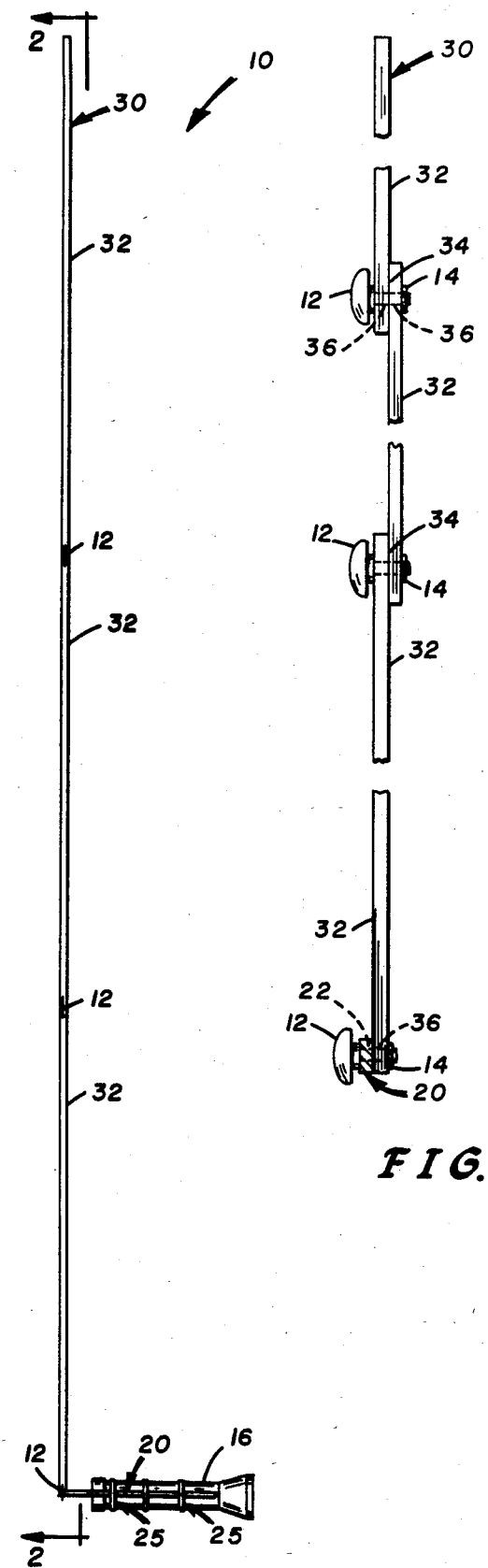
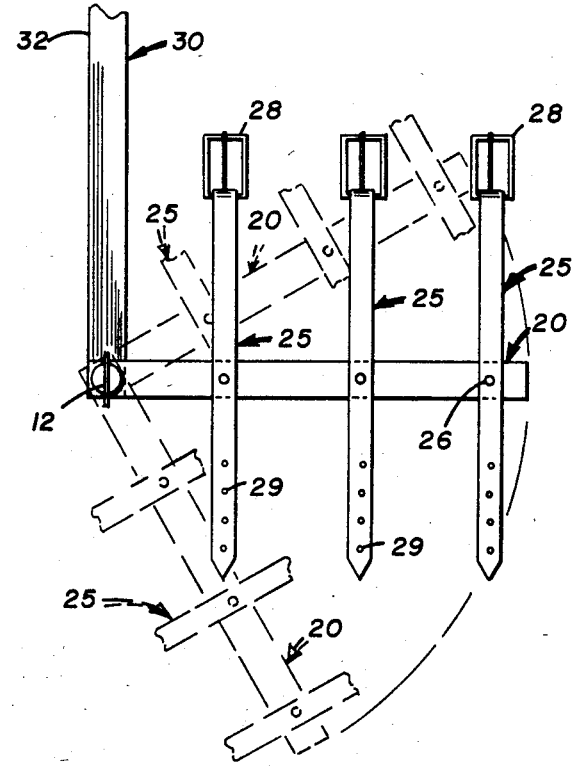
FIG. 1
FIG. 2
FIG. 3

FLASHLIGHT HOLDER

BACKGROUND AND SUMMARY OF THE INVENTION

The invention relates to illumination devices and in particular to flashlight means of illumination. Specifically, it relates to a holder means for extending a flashlight as a main or concentrated source of illumination to a remote point, such as in a manhole below ground or floor level or to an elevated place above ground or floor level, where the need for the main source of light is not readily available.

It is to be noted that while a flashlight may be used for general illumination of points or areas at a distance, the general spread of the light beam of the flashlight may be such that illumination at the distant point or area, such as in the aforementioned manhole or the elevated location, may be rather weak for the degree of inspection or examination being made. In other words, the visibility of the point or area of inspection or examination may not be good enough in general lighting only and may require the close up strong beams of light a short distance from the lens of the flashlight.

The present invention solves this problem by enabling the user to bring the flashlight in close proximity to the point of inspection or examination.

The present invention consists of an extension rod component made up of a plurality of extension rod members suitably affixed to each other by a plurality of connectors, such as bolts and nuts or other similar means, a carrier arm to support the flashlight extended from the distal end of the extension rod, the carrier arm being suitably affixed to the distal end of the extension rod, and a plurality of holder strap members suitably affixed to the carrier arm to hold the flashlight to the carrier arm.

The carrier arm may be affixed in a plurality of positions so that the flashlight beam may be set to shine in various directions at the end of the extension rod means, the extension rod members may also be set in and at a plurality of angles.

It is, therefore, an object of this invention to provide a holder for a flashlight.

It is another object of this invention to provide a holder for a flashlight that can be used to extend the flashlight to a distant point or area.

It is also an object of this invention to provide a holder for a flashlight that can set the flashlight to shine in a plurality of directions.

It is still another object of this invention to provide a holder for a flashlight that is easy to assemble and disassemble for easy compact storage and transport.

It is yet another object of this invention to provide a holder for a flashlight that permits the main close up beam of the flashlight to be brought in close proximity of a point or area that is not readily accessible to a user, such as in a manhole below ground or floor level or at an elevation not easily reached.

Further objects and advantages of the invention will become more apparent in light of the following description of the preferred embodiments.

BRIEF DESCRIPTION OF THE DRAWINGS

FIG. 1 is a side elevation of a flashlight holder with a flashlight mounted therein;

FIG. 2 is a partial sectional view along line 2—2 of FIG. 1; and

FIG. 3 is an enlarged partial side elevation of a flashlight holder without a flashlight mounted therein, and showing holder straps and a plurality of position settings.

DESCRIPTION OF THE PREFERRED EMBODIMENTS

Referring now to the drawings, and particularly to FIG. 1, an improved flashlight holder is shown at 10.

The flashlight holder 10 consists primarily of a carrier arm component 20, a plurality of holding strap components 25, and an extension rod component 30. The elements of these primary components are described hereinafter.

The extension rod component 30 is made up of a plurality of extension rod members 32, three of which are shown in FIGS. 1 and 2 for illustration. It is to be understood that an assembled extension rod component 30 may be made up of any number of extension rod members 32 to meet the requirements of the distance to be reached at the site where needed.

The plurality of extension rod members 32 are removably affixed to each other by suitable connector means 12 and nuts 14 to form the extension rod component 30.

The extension rod members 32 are overlapped 34 in forming the extension rod component 30. The connector means 12 is inserted in and through an aperture 36 in the overlapped 34 extension rod members 32 and a nut 14 is assembled to the distal end of the connector means 12. When the connector means 12 is tightened the extension rod members 32 are rigidly clamped together therebetween.

The carrier 20 is removably affixed to the lowermost end of extension rod component 30 by suitable connector means 12 and a nut 14. The connector means 12 is inserted in and through an aperture 22 in the carrier arm 20 and in and through aperture 36 in the lowermost extension rod member 32 of the extension rod component 30. When the connector means 12 is tightened the carrier arm 20 and the extension rod member 32 are rigidly clamped together therebetween.

The aforementioned suitable connector means 12 may be thumb screws, as illustrated in the drawings, or any other type bolt or similar connecting means and such variations are within the scope and intent of this invention. The connector means 12 act in a manner like a butterfly pressure screw to compress two parts or elements together into a rigid connection.

Likewise the nut 14 may be an ordinary nut, as illustrated in the drawings, or any type nut, such as a wing nut, and such variations are within the scope and intent of this invention.

A plurality of holding strap means 25 are suitably affixed 26 to the carrier arm 20. The plurality of holding strap components 25, three are illustrated in the drawings, are spaced apart along the carrier arm 20. Suitable buckles 28 on the holding strap components 25 with a plurality of mating holes 29 are used to removably affix a flashlight 16 to the carrier arm 20 as shown in FIG. 1. The holding strap means 25 are adjustable to various sizes of flashlights 16.

The suitable affixing means 26 may be rivets or other similar means and such variations are within the scope and intent of this invention.

The carrier arm 20 with the affixed flashlight 16, assembled as described hereinbefore, may be set in a plurality of positions as may be required for the job to be done. Several positions are illustrated in FIG. 3, one with the carrier arm component 20 at 90° to the extension rod component 30, and several others are illustrated by phantom lines, the center of movement being about the clamping affixing means 12 at the connection of carrier arm component 20 to the extension rod component 30.

The components and elements of the extension rod component 30 and the carrier arm 20 may be made of metal, wood, plastics or any other suitable material. The holding straps components 25 may be made of leather, plastics, or any other suitable material with metal, plastics or other suitable material for the buckles 28.

Thus, the present invention provides an extended holder means for a flashlight for providing a primary beam of light at a remote point or area that is not readily accessible.

As can be readily understood from the foregoing description of the invention, the present structure can be configured in different modes to provide the ability to hold a flashlight on an extended rod to provide concentrated light at a remote point or area that is not readily accessible.

Accordingly, modifications and variations to which the invention is susceptible may be practiced without departing from the scope and intent of the appended claims.

What is claimed is:

1. A flashlight holder, comprising:
   an elongated extension rod component having a longitudinal axis, said extension rod component being substantially symmetric about the longitudinal axis and being for a distant extension to a remote area and having an upper and a lower end;
   a carrier arm component, said carrier arm component being suitably affixed to said lower end of said extension rod component, said carrier arm component being capable of being set at a plurality of angles of 90° or plus or minus angles therefrom; and
   a plurality of flexible strap means each comprising a strap body means and a buckle means, said buckle means being suitably affixed to said strap body means, said plurality of flexible strap means being spaced apart and suitably affixed to said carrier arm component, said plurality of flexible strap means being for the purpose of affixing a flashlight to said carrier arm component, said flashlight being capable of affixation to said carrier arm component without the use of a tool.

2. A flashlight holder as recited in claim 1, wherein said extension rod component consists of a plurality of extension rod members, said plurality of extension rod members being assembled in a sequence with a partial overlap of one extension rod member over the next adjacent extension rod member, said extension rod members being capable of assembly in and at a plurality of angles, said extension rod members being suitably affixed to each other at said partial overlap of one extension rod member over the next adjacent extension rod member.

3. A flashlight holder as recited in claim 2, wherein said suitable affixation of one extension rod member to another extension rod member is a thumb screw-type pressure bolt means and a mating nut, said thumb screw-type pressure bolt means being inserted in and through mating apertures through said extension rod members at said overlap.

4. A flashlight holder as recited in claim 2, wherein said plurality of extension rod members are each rectangular in cross section.

5. A flashlight holder as recited in claim 1, wherein said carrier arm component is rectangular in cross section.

6. A flashlight holder as recited in claim 1, wherein said suitable affixation of said carrier arm component to said extension rod component is located at the said lower end of said extension rod component, and said suitable affixation being a thumb screw-type pressure bolt means and a mating nut, said thumb screw-type pressure bolt means being inserted in and through mating apertures through said carrier arm component and said extension rod component at said lower end of extension rod component.

7. A flashlight holder as recited in claim 6, wherein said carrier arm component may be set at a plurality of positions in relation to said extension rod component by so setting said carrier arm component in relation to said extension rod component and then subsequently tightening said suitable affixation.

8. A flashlight holder as recited in claim 6, wherein said suitable affixation of each strap means of said plurality of strap means to said carrier arm component is by a rivet means.

9. A flashlight holder as recited in claim 6, wherein said strap body means is made of leather.

10. A flashlight holder as recited in claim 6, wherein said strap body means is made of a plastics.

11. A flashlight holder as recited in claim 1, wherein said extension rod component and said carrier arm component are made of metal.

12. A flashlight holder as recited in claim 1, wherein said extension rod component and said carrier arm component are made of wood.

13. A flashlight holder as recited in claim 1, wherein said extension rod component and said carrier arm component are made of a plastics.

* * * * *